(12) United States Patent
Hamada

(10) Patent No.: US 11,164,484 B2
(45) Date of Patent: Nov. 2, 2021

(54) SECURE COMPUTATION SYSTEM, SECURE COMPUTATION DEVICE, SECURE COMPUTATION METHOD, AND PROGRAM

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 188 days.

(21) Appl. No.: 16/475,265

(22) PCT Filed: Jan. 18, 2018

(86) PCT No.: PCT/JP2018/001341
§ 371 (c)(1),
(2) Date: Jul. 1, 2019

(87) PCT Pub. No.: WO2018/135563
PCT Pub. Date: Jul. 26, 2018

(65) Prior Publication Data
US 2019/0333415 A1 Oct. 31, 2019

(30) Foreign Application Priority Data
Jan. 20, 2017 (JP) .............................. JP2017-008095

(51) Int. Cl.
*G09C 1/00* (2006.01)
*H04L 9/06* (2006.01)

(52) U.S. Cl.
CPC .............. *G09C 1/00* (2013.01); *H04L 9/0631* (2013.01); *H04L 2209/04* (2013.01); *H04L 2209/46* (2013.01)

(58) Field of Classification Search
CPC .... G09C 1/00; H04L 2209/04; H04L 2209/46
(Continued)

(56) References Cited

U.S. PATENT DOCUMENTS

2007/0274518 A1* 11/2007 Futa ...................... H04L 9/3093
380/30
2015/0381348 A1* 12/2015 Takenaka ................ H04L 9/008
380/30

OTHER PUBLICATIONS

Wahab et al., "Improve NTRU Algorithm based on Chebyshev Polynomial", 978-1-4673-6636-6/15 2015 IEEE (Year: 2015).*

(Continued)

*Primary Examiner* — Khalil Naghdali
(74) *Attorney, Agent, or Firm* — Oblon, McClelland, Maier & Neustadt, L.L.P.

(57) ABSTRACT

A secure computation technique of calculating a polynomial in a shorter calculation time is provided. A secure computation system generates concealed text [[u]] of u, which is the result of magnitude comparison between a value x and a random number r, from concealed text [[x]] by using concealed text [[r]]; generates concealed text [[c]] of a mask c from the concealed text [[x]], [[r]], and [[u]]; reconstructs the mask c from the concealed text [[c]]; calculates, for $i=0, \ldots, n$, a coefficient $b_i$ from an order n, coefficients $a_0, a_1, \ldots, a_n$, and the mask c; generates, for $i=1, \ldots, n$, concealed text [[$s_i$]] of a selected value $s_i$, which is determined in accordance with the result u of magnitude comparison, from the concealed text; [[u]]; and calculates a linear combination $b_0+b_1[[s_1]]+ \ldots +b_n[[s_n]]$ of the coefficient $b_i$ and the concealed text [[$s_i$]] as concealed text $[[a_0+a_1x^1+ \ldots +a_nx^n]]$.

10 Claims, 5 Drawing Sheets

(58) Field of Classification Search
USPC .......................................................... 713/189
See application file for complete search history.

(56) References Cited

OTHER PUBLICATIONS

Mahanta et al., "A Masking Based RSA to Resist Power Analysis Attacks", 2016 International Conference on Computational Techniques in Information and Communication Technologies (Year: 2016).*

International Search Report dated Apr. 10, 2018 in PCT/JP2018/001341 filed Jan. 18, 2018.

Koji Chida, et al., "A Three-Party Secure Function Evaluation with Lightweight Verifiability Revisited," Information Processing Society of Japan Symposium Series, vol. 2010, No. 9, 2010, 6 Pages (with English Abstract).

Ivan Damgård, et al., "Multiparty Computation from Somewhat Homomorphic Encryption," CRYPTO 2012, LNCS 7417, 2012, pp. 643-662.

Liina Kamm, et al., "Secure floating point arithmetic and private satellite collision analysis," International Journal of Information Security, vol. 14, No. 6, 2015, pp. 531-548.

Mehrdad Aliasgari, et al., "Secure Computation on Floating Point Numbers," NDSS 2013, 2013, 31 Pages.

* cited by examiner

| SECURE COMPUTATION ALGORITHM (FIRST EMBODIMENT) |
|---|
| Input: $n, a_0, \cdots, a_n, [[x]], [[r]], \cdots, [[r^n]], [[r-1]], \cdots, [[(r-1)^n]]$ <br> Output: $[[a_0+a_1x+\cdots+a_nx^n]]$ <br> 1: $[[u]] \leftarrow ([[x]] \leq^? [[r]])$ <br> 2: $[[c]] \leftarrow [[x]]-[[r]]+[[u]]$ <br> 3: $c \leftarrow \text{Open}([[c]])$ <br> 4: $b_i \leftarrow \sum_{j=i}^{n} a_j \binom{j}{i} c^{j-i}$ $(i=0,\cdots,n)$ <br> 5: $[[s_i]] \leftarrow \text{IfElse}([[u]],[[(r-1)^i]],[[r^i]])$ $(i=1,\cdots,n)$ <br> 6: $[[a_0+a_1x+\cdots+a_nx^n]] \leftarrow b_0+b_1[[s_1]]+\cdots+b_n[[s_n]]$ |

FIG. 1

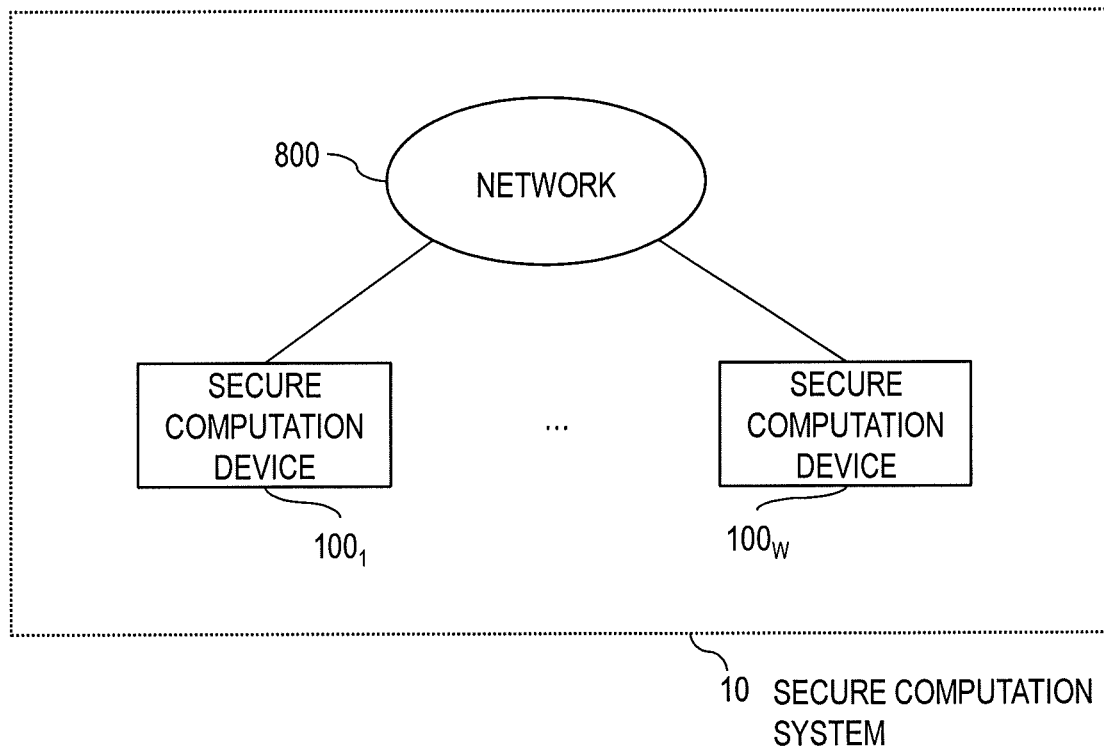

FIG. 2

| SECURE COMPUTATION ALGORITHM (SECOND EMBODIMENT) |
|---|
| Input: $n, a_0, ..., a_n, [[x]], [[r]], ..., [[r^n]], [[r-1]], ..., [[(r-1)^n]]$ <br> Output: $[[1/x]]$ <br> 1: GENERATE CONCEALED TEXT $[[s]], [[e]],$ AND $[[f]]$ OF $s, e,$ AND $f$ WHICH SATISFY $x = s \times 2^e \times f$ ($s \in \{-1, 1\}$, $e$ IS INTEGER, AND $1 \le f < 2$) <br> 2: CALCULATE CONCEALED TEXT $[[a_0+a_1f+...+a_nf^n]]$ (= $[[1/f]]$) BY USING SECURE COMPUTATION ALGORITHM OF FIRST EMBODIMENT BY USING $n, a_0, ..., a_n,$ $[[f]],$ AND $[[r]], ..., [[r^n]], [[r-1]], ..., [[(r-1)^n]]$ AS INPUT <br> 3: $[[1/x]] \leftarrow [[s]] \times ([[1/f]] << [[-e]])$ |

FIG. 5

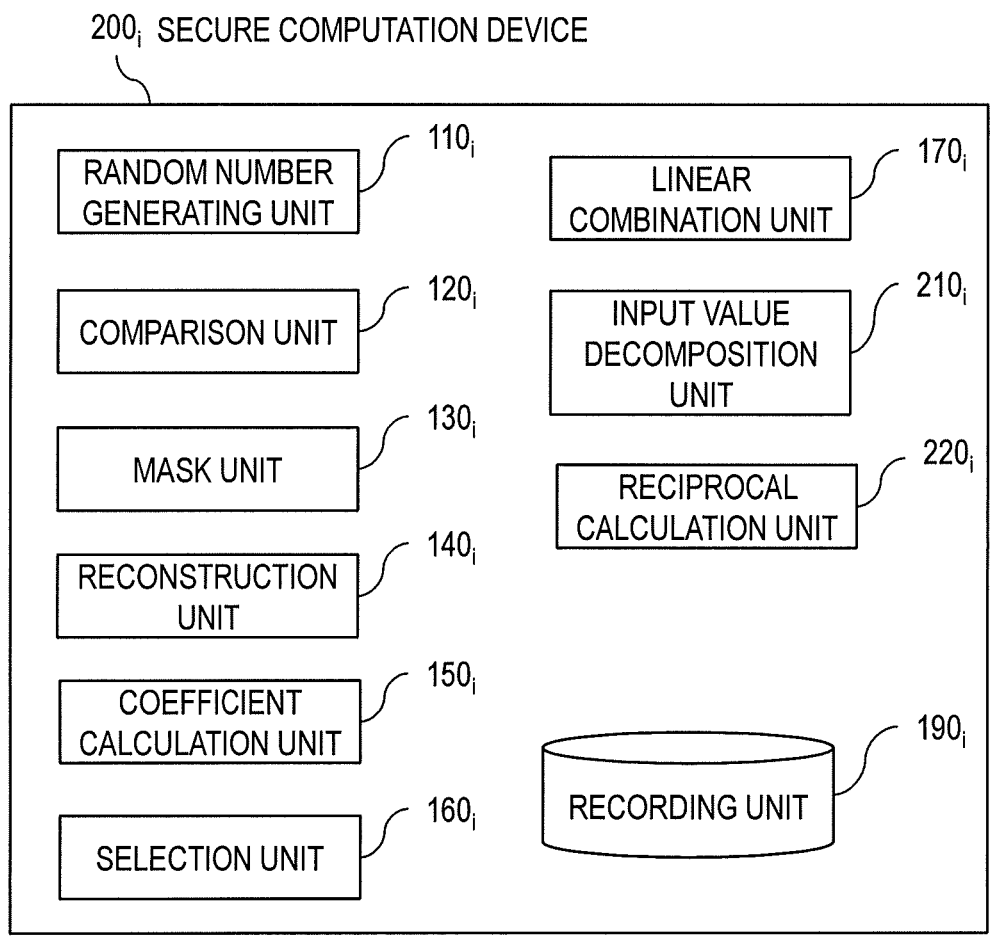

FIG. 6

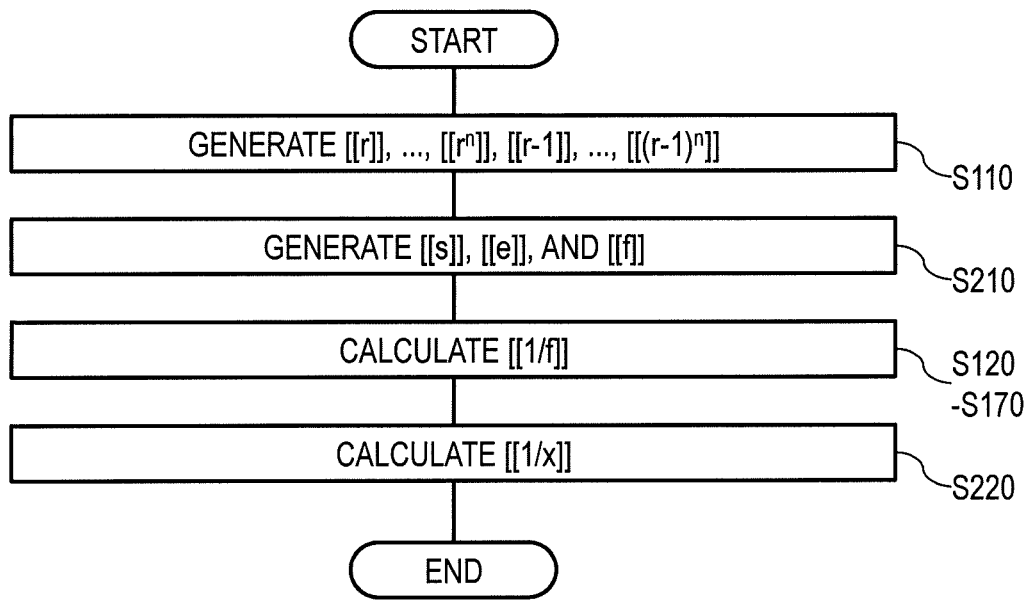

FIG. 7

| SECURE COMPUTATION ALGORITHM (THIRD EMBODIMENT) |
|---|
| Input: $n, a_0, ..., a_n, [[x]], [[r]], ..., [[r^n]], [[r-1]], ..., [[(r-1)^n]]$ <br> Output: $[[\log x]]$ <br>   1: GENERATE CONCEALED TEXT $[[e]]$ AND $[[f]]$ OF e AND f WHICH SATISFY $x = 2^e \times f$ (e IS INTEGER AND $1 \leq f < 2$) <br>   2: CALCULATE CONCEALED TEXT $[[a_0 + a_1 f + ... + a_n f^n]]$ ($= [[\log f]]$) BY USING SECURE COMPUTATION ALGORITHM OF FIRST EMBODIMENT BY USING $n$, $a_0, ..., a_n, [[f]]$, AND $[[r]], ..., [[r^n]], [[r-1]], ..., [[(r-1)^n]]$ AS INPUT <br>   3: $[[\log x]] \leftarrow [[\log f]] + [[e]]$ |

FIG. 8

SECURE COMPUTATION SYSTEM, SECURE COMPUTATION DEVICE, SECURE COMPUTATION METHOD, AND PROGRAM

TECHNICAL FIELD

The present invention relates to secure computation techniques and, in particular, relates to a secure computation technique of calculating a polynomial with an input value kept secret.

BACKGROUND ART

As a method of obtaining the computation result of a designated computation without reconstructing the encrypted numerical values, there is a method called secure computation (see, for example, Non-patent Literature 1). With the method of Non-patent Literature 1, it is possible to perform encryption by which a plurality of pieces of information (shares of a numerical value), whose numerical values can be reconstructed, are distributed over three secure computation devices and make the three secure computation devices hold the results of addition and subtraction, constant addition, multiplication, constant multiplication, logical operations (a NOT, an AND, an OR, and an XOR), and data format conversion (an integer or a binary) with the results being distributed over these secure computation devices, that is, in an encrypted state, without reconstructing the numerical values. In general, the number of secure computation devices over which the information is distributed is not limited to 3 and can be set at W (W is a predetermined constant greater than or equal to 2), and a protocol that implements secure computation by cooperative computations by W secure computation devices is called a multi-party protocol.

It is to be noted that a secure computation method which is performed when the number of secure computation devices over which the information is distributed is 2 is disclosed in Non-patent Literature 2, for example.

As a method that implements calculation of a polynomial by secure computation, there is a method of Non-patent Literature 3. In the method of Non-patent Literature 3, calculation of $x^1, x^2, \ldots, x^n$ is implemented by repeatedly and concurrently performing processing by which each of $x^1, x^2, \ldots, x^{2^{\lfloor \log_2 mk \rfloor}}$ is multiplied by $x^{2^{\lfloor \log_2 mk \rfloor}}$ ($k=0, 1, \ldots$) when calculation of a polynomial in a variable x is performed (it is to be noted that ^ (caret) represents a superscript; for example, $x^{y^{\lfloor \log_2 mz \rfloor}}$ indicates that $y^z$ is a superscript for x).

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", Information Processing Society of Japan Symposium Series, Vol. 2010, No. 9, pp. 555-560, 2010.

Non-patent Literature 2: Ivan Damgard, Valerio Pastro, Nigel Smart, Sarah Zakarias, "Multiparty Computation from Somewhat Homomorphic Encryption", CRYPTO 2012, LNCS7417, pp. 643-662, 2012.

Non-patent Literature 3: Liina Kamm, Jan Willemson, "Secure floating point arithmetic and private satellite collision analysis", International Journal of Information Security, Vol. 14, No. 6, pp. 531-548, 2015.

SUMMARY OF THE INVENTION

Problems to be Solved by the Invention

However, in the method of Non-patent Literature 3, 2n−1 (ceiling($\log_2 n$)+1 stage) multiplication and n addition have to be executed when a polynomial $a_0+a_1x^1+ \ldots +a_nx^n$ is calculated, which makes a calculation time undesirably long.

Therefore, an object of the present invention is to provide a secure computation technique of calculating a polynomial in a shorter calculation time.

Means to Solve the Problems

An aspect of the present invention is a secure computation system in which $a_0+a_1x^1+ \ldots +a_nx^n$ is assumed to be an n-th order polynomial (n is the order of the polynomial and $a_0, a_1, \ldots, a_n$ are coefficients of the polynomial) in a variable x, x is assumed to be a value which is substituted into the n-th order polynomial, k is assumed to be an integer which satisfies $k \leq x < k+1$, r is assumed to be a random number which satisfies $k \leq r < k+1$, and $[[r]], [[r^2]], \ldots, [[r^n]], [[r-1]], [[(r-1)^2]], \ldots, [[(r-1)^n]]$ are assumed to be concealed text of a power of the random number r and a power of r−1, the secure computation system which is configured with two or more secure computation devices and calculates, from concealed text $[[x]]$ of the value x, concealed text $[[a_0+a_1x^1+ \ldots +a_nx^n]]$ of the values of the n-th order polynomial $a_0+a_1x^1+ \ldots +a_nx^n$ in which the value x is substituted. The secure computation system includes: a comparing means that generates concealed text $[[u]]$ of u (u=1 if $x \leq r$ holds and u=0 if $x \leq r$ does not hold), which is the result of magnitude comparison between the value x and the random number r, from the concealed text $[[x]]$ by using the concealed text $[[r]]$; a mask means that generates concealed text $[[c]]$ of a mask c as $[[c]]=[[x]]-[[r]]+[[u]]$ from the concealed text $[[x]]$, the concealed text $[[r]]$, and the concealed text $[[u]]$; a reconstructing means that reconstructs the mask c from the concealed text $[[c]]$; a coefficient calculating means that calculates, for $i=0, \ldots, n$, a coefficient $b_i$ by the formula below from the order n, the coefficients $a_0, a_1, \ldots, a_n$, and the mask c;

$$b_i = \sum_{j=i}^{n} a_j \binom{j}{i} c^{j-i}$$

a selecting means that generates, for $i=1, \ldots, n$, concealed text $[[s_i]]$ of a selected value $s_i$ ($s_i=(r-1)^i$ if u=1 and $s_i=r^i$ if u=0), which is determined in accordance with the result u of magnitude comparison, from the concealed text $[[u]]$; and a linear combination means that calculates a linear combination $b_0+b_1[[s_1]]+ \ldots +b_n[[s_n]]$ of the coefficient $b_i$ ($i=0, \ldots, n$) and the concealed text $[[s_i]]$ ($i=1, \ldots, n$) as the concealed text $[[a_0+a_1x^1+ \ldots +a_nx^n]]$.

An aspect of the present invention is a secure computation system in which $a_0+a_1x^1+ \ldots +a_nx^n$ is assumed to be an n-th order polynomial (n is the order of the polynomial and $a_0, a_1, \ldots, a_n$ are coefficients of the polynomial) in a variable x, x is assumed to be a value which is substituted into the n-th order polynomial, r is assumed to be a random number which satisfies $1 \leq r < 2$, $[[r]], [[r^2]], \ldots, [[r^n]], [[r-1]], [[(r-1)^2]], \ldots, [[(r-1)^n]]$ are assumed to be concealed text of a power of the random number r and a power of r−1, and the reciprocal 1/x of the value x is assumed to be expressed as $1/x=a_0+a_1x^1+\ldots+a_nx^n$, the secure computation system which is configured with two or more secure computation devices and calculates concealed text [[1/x]] of the reciprocal 1/x from concealed text [[x]] of the value x. The secure computation system includes: an input value decomposing means that generates, from the concealed text [[x]], concealed text [[s]], [[e]], and [[f]] of s, e, and f which satisfy $x=s\times 2^e\times f$ ($s \in \{-1, 1\}$, e is an integer, and $1\leq f<2$); a comparing means that generates concealed text [[u]] of u (u=1 if f≤r holds and u=0 if f≤r does not hold), which is the result of magnitude comparison between the f and the random number r, from the concealed text [[f]] by using the concealed text [[r]]; a mask means that generates concealed text [[c]] of a mask c as [[c]]=[[f]]−[[r]]+[[u]] from the concealed text [[f]], the concealed text [[r]], and the concealed text [[u]]; a reconstructing means that reconstructs the mask c from the concealed text [[c]]; a coefficient calculating means that calculates, for i=0, . . . , n, a coefficient $b_i$ by the formula below from the order n, the coefficients $a_0, a_1, \ldots, a_n$, and the mask c;

$$b_i = \sum_{j=i}^{n} a_j \binom{j}{i} c^{j-i}$$

a selecting means that generates, for i=1, . . . , n, concealed text [[$s_i$]] of a selected value $s_i$ ($s_i=(r-1)^i$ if u=1 and $s_i=r^i$ if u=0), which is determined in accordance with the result u of magnitude comparison, from the concealed text [[u]]; a linear combination means that calculates a linear combination $b_0+b_1[[s_1]]+\ldots+b_n[[s_n]]$ of the coefficient $b_i$ (i=0, . . . , n) and the concealed text [[$s_i$]] (i=1, . . . , n) as concealed text [[1/f]] of the reciprocal 1/f of the f; and a reciprocal calculating means that calculates [[s]]×([[1/f]]<<[[−e]]) (where [[1/f]]<<[[−e]] is a value obtained by shifting 1/f to the left by −e bit) as the concealed text [[1/x]] from the concealed text [[s]], the concealed text [[e]], and the concealed text [[1/f]].

An aspect of the present invention is a secure computation system in which $a_0+a_1x^1+\ldots+a_nx^n$ is assumed to be an n-th order polynomial (n is the order of the polynomial and $a_0, a_1, \ldots, a_n$ are coefficients of the polynomial) in a variable x, x is assumed to be a value which is substituted into the n-th order polynomial, r is assumed to be a random number which satisfies $1\leq r<2$, [[r]], [[$r^2$]], . . . , [[$r^n$]], [[r−1]], [[$(r-1)^2$]], . . . , [[$(r-1)^n$]] are assumed to be concealed text of a power of the random number r and a power of r−1, and the logarithm log x of the value x is assumed to be expressed as $\log x=a_0+a_1x^1+\ldots+a_nx^n$, the secure computation system which is configured with two or more secure computation devices and calculates concealed text [[log x]] of the logarithm log x from concealed text [[x]] of the value x. The secure computation system includes: an input value decomposing means that generates, from the concealed text [[x]], concealed text [[e]] and [[f]] of e and f which satisfy $x=2^e\times f$ (e is an integer and $1\leq f<2$); a comparing means that generates concealed text [[u]] of u (u=1 if f≤r holds and u=0 if f≤r does not hold), which is the result of magnitude comparison between the f and the random number r, from the concealed text [[f]] by using the concealed text [[r]]; a mask means that generates concealed text [[c]] of a mask c as [[c]]=[[f]]−[[r]]+[[u]] from the concealed text [[f]], the concealed text [[r]], and the concealed text [[u]]; a reconstructing means that reconstructs the mask c from the concealed text [[c]]; a coefficient calculating means that calculates, for i=0, . . . , n, a coefficient $b_i$ by the formula below from the order n, the coefficients $a_0, a_1, \ldots, a_n$, and the mask c;

$$b_i = \sum_{j=i}^{n} a_j \binom{j}{i} c^{j-i}$$

a selecting means that generates, for i=1, . . . , n, concealed text [[$s_i$]] of a selected value $s_i$ ($s_i=(r-1)^i$ if u=1 and $s_i=r^i$ if u=0), which is determined in accordance with the result u of magnitude comparison, from the concealed text [[u]]; a linear combination means that calculates a linear combination $b_0+b_1[[s_1]]+\ldots+b_n[[s_n]]$ of the coefficient $b_i$ (i=0, . . . , n) and the concealed text [[$s_i$]] (i=1, . . . , n) as concealed text [[log f]] of the logarithm log f of the f; and a logarithm calculating means that calculates [[log f]]+[[e]], which is a value obtained by adding e to the logarithm log f, as the concealed text [[log x]] from the concealed text [[e]] and the concealed text [[log f]].

Effects of the Invention

According to the present invention, by performing 1 stage multiplication as a multiplication necessary for calculation of a polynomial, it is possible to reduce the calculation time necessary for secure computation of the polynomial.

BRIEF DESCRIPTION OF THE DRAWINGS

FIG. 1 is a diagram depicting procedures of a secure computation algorithm of a first embodiment.
FIG. 2 is a block diagram depicting the configuration of a secure computation system 10.
FIG. 5 is a diagram depicting procedures of a secure computation algorithm of a second embodiment.
FIG. 6 is a block diagram depicting the configuration of a secure computation device $200_i$.
FIG. 7 is a flowchart showing an operation of a secure computation system 20.
FIG. 8 is a diagram depicting procedures of a secure computation algorithm of a third embodiment.

DETAILED DESCRIPTION OF THE EMBODIMENTS

Figure 3:
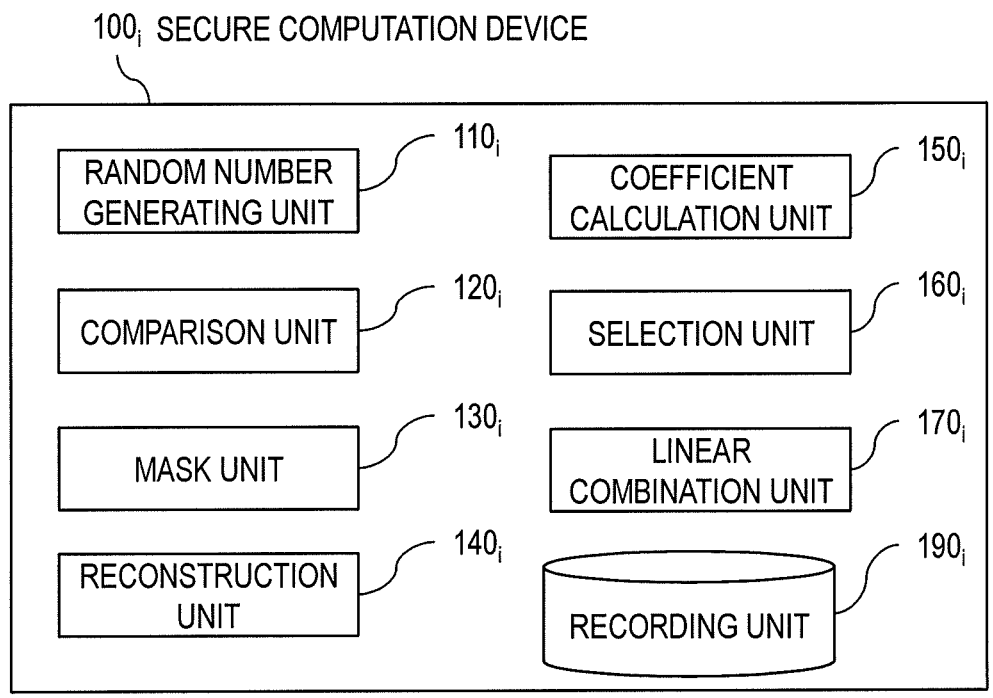
FIG. 3 is a block diagram depicting the configuration of a secure computation device $100_i$.

Hereinafter, embodiments of the present invention will be described in detail. It is to be noted that constituent units having the same function will be identified with the same reference character and overlapping explanations will be omitted.

A secure computation algorithm, which will be described later, is constructed by combining computations on the existing secure computation. The computations required by the secure computation algorithm are concealment and reconstruction, addition, subtraction, multiplication, comparison, selection, and left shift. First, definition, notation, and the like of each computation will be described.

<Definitions, Notation, etc.>
[Concealment and Reconstruction]

It is assumed that a value obtained by concealing a value a by encryption, secret sharing, or the like is referred to as concealed text of a and expressed as $[[a]]$. It is assumed that, when the concealed text $[[a]]$ of a is generated by secret sharing, a set of shares of secret sharing, which the secure computation devices hold, is referred to based on $[[a]]$.

Moreover, it is assumed that processing by which a is obtained by reconstructing the concealed text $[[a]]$ of a is expressed as $a \leftarrow \text{Open}([[a]])$.

As a method of concealment and reconstruction, specifically, there is a technique of Reference Non-patent Literature 1.

(Reference Non-patent Literature 1) Mehrdad Aliasgari, Marina Blanton, Yihua Zhang, Aaron Steele, "Secure Computation on Floating Point Numbers", NDSS 2013, 2013.

In Reference Non-patent Literature 1, floating-point operations are disclosed. Fixed-point or integer operations can be implemented by combining type conversions from a floating-point type to a fixed-point or integer type disclosed in Reference Non-patent Literature 1.

[Addition, Subtraction, Multiplication]

Addition, subtraction, and multiplication calculate concealed text $[[c_1]]$, $[[c_2]]$, and $[[c_3]]$ of a sum $c_1$, a difference $c_2$, and a product $c_3$, which are the calculation results of a+b, a−b, and ab, respectively, by using concealed text $[[a]]$ and $[[b]]$ of two values a and b as input. It is assumed that processing by which $[[c_1]]$ is obtained, processing by which $[[c_2]]$ is obtained, and processing by which $[[c_3]]$ is obtained are respectively expressed as $[[c_1]] \leftarrow \text{Add}([[a]], [[b]])$, $[[c_2]] \leftarrow \text{Sub}([[a]], [[b]])$, and $[[c_3]] \leftarrow \text{Mul}([[a]], [[b]])$. When there is no possibility of misunderstanding, $\text{Add}([[a]], [[b]])$, $\text{Sub}([[a]], [[b]])$, and $\text{Mul}([[a]], [[b]])$ are sometimes abbreviated as $[[a]]+[[b]]$, $[[a]]-[[b]]$, and $[[a]]\times[[b]]$, respectively.

As a method of addition, subtraction, and multiplication, specifically, there is the technique of Reference Non-patent Literature 1. In Reference Non-patent Literature 1, floating-point operations are disclosed. Fixed-point or integer operations can be implemented by combining type conversions from a floating-point type to a fixed-point or integer type disclosed in Reference Non-patent Literature 1.

[Comparison]

It is assumed that processing by which, for concealed text $[[a]]$ of a and concealed text $[[b]]$ of b, concealed text $[[c]]$ of the result c of magnitude comparison between a and b, which makes c=1 hold if $a \leq b$ holds and c=0 hold if $a \leq b$ does not hold, is calculated is expressed as $[[c]] \leftarrow ([[a]] \leq^? [[b]])$.

As a method of comparison, specifically, there is the technique of Reference Non-patent Literature 1. In Reference Non-patent Literature 1, floating-point operations are disclosed. Fixed-point or integer operations can be implemented by combining type conversions from a floating-point type to a fixed-point or integer type disclosed in Reference Non-patent Literature 1.

[Selection]

It is assumed that processing by which, for concealed text $[[a]]$ of $a \in \{0, 1\}$ and concealed text $[[t]]$ and $[[f]]$ of two values t and f, concealed text $[[b]]$ of a selected value b, which makes b=t hold if a=1 and b=f hold if a=0, is calculated is expressed as $[[b]] \leftarrow \text{IfElse}([[a]], [[t]], [[f]])$. This selection processing can be implemented by using multiplication and addition as follows: $\text{IfElse}([[a]], [[t]], [[f]]) := [[a]]\times[[t]]+[[a]]\times[[f]]$.

[Left Shift]

It is assumed that processing by which concealed text $[[c]]$ of a left shift value c ($=a \times 2^b$), which is a value obtained by shifting a to the left by b bit (that is, a value obtained by multiplying a by $2^b$), is calculated from concealed text $[[a]]$ of a and concealed text $[[b]]$ of b is expressed as $[[c]] \leftarrow [[a]] << [[b]]$.

As for floating-point operations, it is only necessary to add a shift amount (y of x<<y) to an exponent part. Moreover, as for fixed-point or integer operations, it is only necessary to combine interconversion between a fixed-point number and a floating-point number of Reference Non-patent Literature 1 and the above-described shifting of a floating-point number to the left.

First Embodiment

Hereinafter, input and output and procedures of a secure computation algorithm of a first embodiment and a secure computation system that implements the secure computation algorithm of the first embodiment will be described.

[Input and Output]

Input and output of the secure computation algorithm of the first embodiment shown in FIG. 1 will be described.

Input is the order n and coefficients $a_0, a_1, \ldots, a_n$ of a polynomial $a_0+a_1x^1+\ldots+a_nx^n$ and concealed text $[[x]]$ of a value x which is substituted into the polynomial. Moreover, concealed text $[[r]], [[r^2]], \ldots, [[r^n]], [[r-1]], [[(r-1)^2]], \ldots, [[(r-1)^n]]$ of a power of a random number r, which satisfies $k \leq r < k+1$ (where k is assumed to be an integer which satisfies $k \leq x < k+1$), and a power of r−1 is also input.

Output is concealed text $[[a_0+a_1x^1+\ldots+a_nx^n]]$ of the values of the polynomial $a_0+a_1x^1+\ldots+a_nx^n$ in which x is substituted.

[Procedures]

The procedures of the secure computation algorithm of the first embodiment depicted in FIG. 1 will be described. In so doing, expressions such as Step 1 and Step 2 are adopted by using the numerals on the left end of FIG. 1.

In Step 1, concealed text $[[u]] \leftarrow ([[x]] \leq^? [[r]])$ of u, which is the result of magnitude comparison between x and the random number r, is generated from the input concealed text $[[x]]$ and $[[r]]$. $[[u]]$ is concealed text of u which makes u=1 hold if $x \leq r$ holds and u=0 hold if $x \leq r$ does not hold.

In Step 2, concealed text $[[c]]$ of a mask c is generated as $[[c]]=[[x]]-[[r]]+[[u]]$ from the concealed text $[[x]]$ and $[[r]]$ and the concealed text $[[u]]$ generated in Step 1. The mask c satisfies $0 < c \leq 1$.

In Step 3, the mask c is reconstructed from the concealed text $[[c]]$ generated in Step 2.

In Step 4, a coefficient $b_i$ is calculated for i=0, . . . , n by the formula below from the order n, the coefficients $a_0$, $a_1, \ldots, a_n$, and c reconstructed in Step 3.

$$b_i = \sum_{j=i}^{n} a_j \binom{j}{i} c^{j-i}$$

In Step 5, concealed text $[[s_i]] = \text{IfElse}([[u]], [[(r-1)^i]], [[r^i]])$ of a selected value $s_i$, which is determined in accordance with the result u of magnitude comparison, is generated for i=1, . . . , n from the concealed text $[[u]]$ generated in Step 1. $[[s_i]]$ is concealed text which makes $s_i=(r-1)^i$ hold if u=1 and $s_i=r^i$ hold if u=0. That is, $[[s_i]]=[[(r-1)^i]]$ holds if $[[u]]=[[1]]$ and $[[s_i]]=[[r^i]]$ holds if $[[u]]=[[0]]$.

In Step 6, a linear combination $b_0+b_1[[s_1]]+\ldots+b_n[[s_n]]$ is calculated from the coefficient $b_i$ (i=0, . . . , n) generated in Step 4 and the concealed text $[[s_i]]$ (i=1, . . . , n) generated in Step 5. Here, $[[a_0+a_1x^1+ \ldots +a_nx^n]]=b_0+b_1[[s_1]]+ \ldots +b_n[[s_n]]$ holds.

[Secure Computation System]

Figure 4:
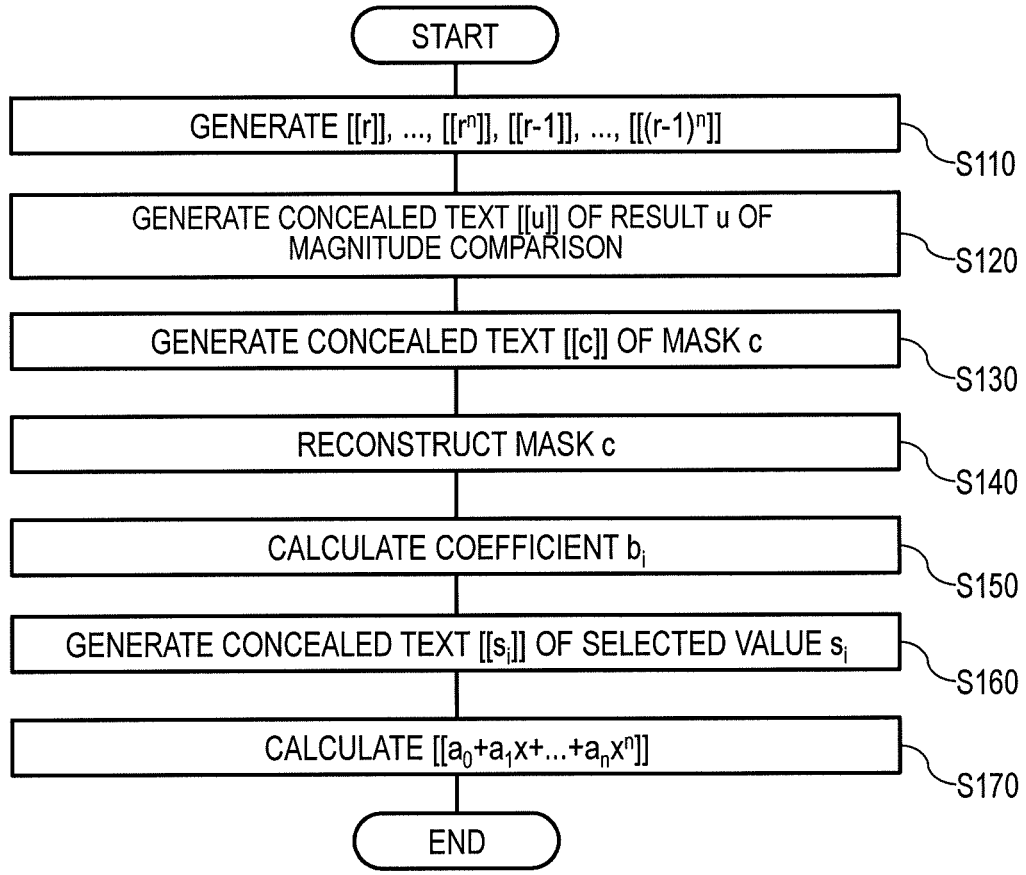
FIG. 4 is a flowchart showing an operation of the secure computation system 10.

Hereinafter, a secure computation system 10 of the first embodiment will be described with reference to FIGS. 2 to 4. FIG. 2 is a block diagram depicting the configuration of the secure computation system 10. The secure computation system 10 includes W (W is a predetermined integer greater than or equal to 2) secure computation devices $100_1$, . . . , $100_W$. The secure computation devices $100_1$, . . . , $100_W$ are connected to a network 800 and can communicate with each other. The network 800 may be, for example, a communications network such as the Internet or a broadcast communication channel. FIG. 3 is a block diagram depicting the configuration of a secure computation device $100_i$ (1≤i≤W). FIG. 4 is a flowchart showing an operation of the secure computation system 10.

As depicted in FIG. 3, the secure computation device $100_i$ includes a random number generating unit $110_i$, a comparison unit $120_i$, a mask unit $130_i$, a reconstruction unit $140_i$, a coefficient calculation unit $150_i$, a selection unit $160_i$, a linear combination unit $170_i$, and a recording unit $190_i$. Apart from the recording unit $190_i$, the constituent units of the secure computation device $100_i$ are configured so as to be capable of executing, of computations which are required in the secure computation algorithm, that is, at least concealment, reconstruction, addition, subtraction, multiplication, comparison, and selection, computations which are required to implement the functions of the constituent units. In the present invention, as specific functional configurations for implementing individual computations, configurations that can execute the algorithms in, for example, Non-patent Literatures disclosed as Prior Art Literature and Reference Non-patent Literature disclosed in <Definitions, notation, etc.> serve the purpose, and their detailed explanations will be omitted because they are the existing configurations. Moreover, the recording unit $190_i$ is a constituent unit that records information which is necessary for processing of the secure computation device $100_i$. For instance, the order n and the coefficients $a_0, a_1, \ldots, a_n$ are recorded thereon.

By cooperative computations which are performed by the W secure computation devices $100_i$, the secure computation system 10 implements the secure computation algorithm which is a multi-party protocol. Thus, a random number generating means 110 (which is not depicted in the drawing) of the secure computation system 10 is configured with the random number generating units $110_1$, . . . , $110_W$, a comparing means 120 (which is not depicted in the drawing) is configured with the comparison units $120_1$, . . . , $120_W$, a mask means 130 (which is not depicted in the drawing) is configured with the mask units $130_1$, . . . , $130_W$, a reconstructing means 140 (which is not depicted in the drawing) is configured with the reconstruction units $140_1$, . . . , $140_W$, a coefficient calculating means 150 (which is not depicted in the drawing) is configured with the coefficient calculation units $150_1$, . . . , $150_W$, a selecting means 160 (which is not depicted in the drawing) is configured with the selection units $160_1$, . . . , $160_W$, and a linear combination means 170 (which is not depicted in the drawing) is configured with the linear combination units $170_1$, . . . , $170_W$.

By using concealed text $[[r]], [[r^2]], \ldots, [[r^n]], [[r-1]], [[(r-1)^2]], \ldots, [[(r-1)^n]]$ of a power of the previously generated random number r (k≤r<k+1, where k is an integer which satisfies k≤x<k+1) and a power of r−1, the secure computation system 10 calculates, from concealed text $[[x]]$ of a value x which is substituted into a polynomial, concealed text $[[a_0+a_1x^1+ \ldots +a_nx^n]]$ of the values of a polynomial $a_0+a_1x^1+ \ldots +a_nx^n$ in which x is substituted. Hereinafter, an operation of the secure computation system 10 will be described in accordance with FIG. 4.

The random number generating means 110 generates a random number r which satisfies k≤r<k+1 and generates concealed text $[[r]], [[r^2]], \ldots, [[r^n]], [[r-1]], [[(r-1)^2]], \ldots, [[(r-1)^n]]$ (S110). This corresponds to a preliminary setup of input values of the secure computation algorithm of FIG. 1. The concealed text $[[r]], [[r^2]], \ldots, [[r^n]], [[r-1]], [[(r-1)^2]], \ldots, [[(r-1)^n]]$ is recorded on the recording units $190_1$, . . . , $190_W$.

By using the concealed text $[[r]]$ generated before input of the concealed text $[[x]]$, the comparing means 120 generates concealed text $[[u]] \leftarrow ([[x]] \leq^? [[r]])$ of u, which is the result of magnitude comparison between a value x and the random number r, from the concealed text $[[x]]$ (S120). This corresponds to Step 1 of the secure computation algorithm of FIG. 1.

The mask means 130 generates concealed text $[[c]]$ of a mask c as $[[c]]=[[x]]-[[r]]+[[u]]$ from the concealed text $[[x]]$ and $[[r]]$ and the concealed text $[[u]]$ generated in S120 (S130). This corresponds to Step 2 of the secure computation algorithm of FIG. 1.

The reconstructing means 140 reconstructs the mask c from the concealed text $[[c]]$ generated in S130 (S140). This corresponds to Step 3 of the secure computation algorithm of FIG. 1.

The coefficient calculating means 150 calculates, for i=0, . . . , n, a coefficient $b_i$ by the formula below from the order n and the coefficients $a_0, a_1, \ldots, a_n$ of the polynomial and the mask c reconstructed in S140 (S150). This corresponds to Step 4 of the secure computation algorithm of FIG. 1.

$$b_i = \sum_{j=i}^{n} a_j \binom{j}{i} c^{j-i}$$

The selecting means 160 generates, for i=1, . . . , n, concealed text $[[s_i]]$ of a selected value $s_i$ ($s_i=(r-1)^i$ if u=1 and $s_i=r^i$ if u=0), which is determined in accordance with the result u of magnitude comparison, from the concealed text $[[u]]$ generated in S120 (S160). This corresponds to Step 5 of the secure computation algorithm of FIG. 1.

The linear combination means 170 calculates a linear combination $b_0+b_1[[s_1]]+ \ldots +b_n[[s_n]]$ from the coefficient $b_i$ (i=0, . . . , n) generated in S150 and the concealed text $[[s_i]]$ (i=1, . . . , n) generated in S160 (S170). This corresponds to Step 6 of the secure computation algorithm of FIG. 1.

According to the invention of the present embodiment, since calculation of the polynomial $a_0+a_1x^1+ \ldots +a_nx^n$ can be implemented by n addition, n (1 stage) multiplication, one comparison, and one reconstruction operation, calculation cost is reduced. In particular, in a case where additions can be ignored, such as calculation in fixed-point calculation, the calculation time is effectively reduced. Specifically, processing which has required about 2n−1 (ceiling($\log_2 n$)+1 stage) bit decomposition operation can be implemented by n+1 (2 stage) processing operations. Moreover, by using the fact that the range of the value x which is substituted into the polynomial is limited to k≤x<k+1, processing by which the output value $[[a_0+a_1x^1+ \ldots +a_nx^n]]$ is calculated from the input value $[[x]]$ is reduced to processing by which calculation is performed by using x−r+u and the concealed text $[[r]], [[r^2]], \ldots, [[r^n]], [[r-1]], [[(r-1)^2]] \ldots [[(r-1)^n]]$ of a power of the previously generated random number r and a power of r−1. In general, information leaks when x−r+u is reconstructed; however, by adjusting x−r+u so as to be uniform random values greater than 0 and smaller than or equal to 1, it is possible to securely execute calculation of $a_0+a_1x^1+ \ldots +a_nx^n$.

Second Embodiment

When the reciprocal 1/x of x can be expressed as $1/x=a_0+a_1x^1+ \ldots +a_nx^n$ by using a polynomial, concealed text [[1/x]] of the reciprocal 1/x can be efficiently calculated from concealed text [[x]] of x by using the secure computation algorithm of the first embodiment.

Hereinafter, input and output and procedures of a secure computation algorithm of a second embodiment and a secure computation system that implements the secure computation algorithm of the second embodiment will be described.

[Input and Output]

Input and output of the secure computation algorithm of the second embodiment shown in FIG. 5 will be described.

Input is the order n and coefficients $a_0, a_1, \ldots, a_n$ of a polynomial $a_0+a_1x^1+ \ldots +a_nx^n$ and concealed text [[x]] of a value x whose reciprocal is subjected to calculation of the value. Moreover, concealed text $[[r]], [[r^2]], \ldots, [[r^n]], [[r-1]], [[(r-1)^2]], \ldots, [[(r-1)^n]]$ of a power of a random number r, which satisfies 1≤r<2, and a power of r−1 is also input.

Output is concealed text [[1/x]] of the reciprocal 1/x of x.

[Procedures]

The procedures of the secure computation algorithm of the second embodiment depicted in FIG. 5 will be described. In so doing, expressions such as Step 1 and Step 2 are adopted by using the numerals on the left end of FIG. 5.

In Step 1, for the input concealed text [[x]], concealed text [[s]], [[e]], and [[f]] of s, e, and f which satisfy $x=s \times 2^e \times f$ (s ∈ {−1, 1}, e is an integer, and 1≤f<2) is generated. By using operations of Reference Non-patent Literature 1 to determine floating-point representation of [[x]], the concealed text [[s]], [[e]], and [[f]] can be generated.

In Step 2, $[[a_0+a_1f^1+ \ldots +a_nf^n]]$ is calculated from the order n and the coefficients $a_0, a_1, \ldots, a_n$ of the polynomial, the concealed text $[[r]], [[r^2]], \ldots, [[r^n]], [[r-1]], [[(r-1)^2]], \ldots, [[(r-1)^n]]$, and the concealed text [[f]] generated in Step 1. Here, $[[a_0+a_1f^1+ \ldots +a_nf^n]]=[[1/f]]$ holds.

In Step 3, $[[s]] \times ([[1/f]] \ll [[-e]])$ is calculated from the concealed text [[s]] and [[e]] generated in Step 1 and the concealed text [[1/f]] calculated in Step 2. Here, $[[s]] \times ([[1/f]] \ll [[-e]])=[[1/x]]$ holds.

[Secure Computation System]

Hereinafter, a secure computation system 20 of the second embodiment will be described with reference to FIGS. 6 and 7. The secure computation system 20 differs from the secure computation system 10 in that the secure computation system 20 includes W (W is a predetermined integer greater than or equal to 2) secure computation devices $200_1, \ldots, 200_W$ instead of including W secure computation devices $100_1, \ldots, 100_W$. FIG. 6 is a block diagram depicting the configuration of a secure computation device $200_i$ (1≤i≤W). FIG. 7 is a flowchart showing an operation of the secure computation system 20.

As depicted in FIG. 6, the secure computation device $200_i$ differs from the secure computation device $100_i$ in that the secure computation device $200_i$ further includes an input value decomposition unit $210_i$ and a reciprocal calculation unit $220_i$. The input value decomposition unit $210_i$ and the reciprocal calculation unit $220_i$ are also configured so as to be capable of executing, of computations which are required in the secure computation algorithm, computations which are required to implement the functions thereof.

An input value decomposing means 210 of the secure computation system 20 is configured with the input value decomposition units $210_1, \ldots, 210_W$, and a reciprocal calculating means 220 is configured with the reciprocal calculation units $220_1, \ldots, 220_W$.

By using concealed text $[[r]], [[r^2]], \ldots, [[r^n]], [[r-1]], [[(r-1)^2]], \ldots, [[(r-1)^n]]$ of a power of the previously generated random number r (1≤r<2) and a power of r−1, the secure computation system 20 calculates concealed text [[1/x]] of the reciprocal 1/x of x from concealed text [[x]] of the value x which is substituted into a polynomial. Hereinafter, an operation of the secure computation system 20 will be described in accordance with FIG. 7.

The random number generating means 110 generates a random number r which satisfies 1≤r<2 and generates concealed text $[[r]], [[r^2]], \ldots, [[r^n]], [[r-1]], [[(r-1)^2]], \ldots, [[(r-1)^n]]$ (S110). This corresponds to a preliminary setup of input values of the secure computation algorithm of FIG. 5. The concealed text $[[r]], [[r^2]], \ldots, [[r^n]], [[r-1]], [[(r-1)^2]], \ldots, [[(r-1)^n]]$ is recorded on the recording units $190_1, \ldots, 190_W$.

The input value decomposing means 210 generates, from the concealed text [[x]], concealed text [[s]], [[e]], and [[f]] of s, e, and f which satisfy $x=s \times 2^e \times f$ (s ∈ {−1, 1}, e is an integer, and 1≤f<2) (S210). This corresponds to Step 1 of the secure computation algorithm of FIG. 5.

The comparing means 120, the mask means 130, the reconstructing means 140, the coefficient calculating means 150, the selecting means 160, and the linear combination means 170 calculate $[[a_0+a_1f^1+ \ldots +a_nf^n]]$ (=[[1/f]]) from the order n and the coefficients $a_0, a_1, \ldots, a_n$ of the polynomial, the concealed text $[[r]], [[r^2]], \ldots, [[r^n]], [[r-1]], [[(r-1)^2]], \ldots, [[(r-1)^n]]$ generated before input of [[x]], and the concealed text [[f]] generated in S210 (S120 to S170). This corresponds to Step 2 of the secure computation algorithm of FIG. 5 (Steps 1 to 6 of the secure computation algorithm of FIG. 1).

The reciprocal calculating means 220 calculates $[[s]] \times ([[1/f]] \ll [[-e]])$ as concealed text [[1/x]] of the reciprocal 1/x from the concealed text [[s]] and [[e]] generated in S210 and the concealed text [[1/f]] calculated in S120 to S170 (S220). This corresponds to Step 3 of the secure computation algorithm of FIG. 5.

According to the invention of the present embodiment, by performing calculation of the polynomial $a_0+a_1x^1+ \ldots +a_nx^n$ by using the secure computation algorithm of the first embodiment, it is possible to reduce the cost of calculating the concealed text [[1/x]] of the reciprocal 1/x from the concealed text [[x]]. Moreover, by using the fact that the range of f, which is obtained by decomposing x, is limited to 1≤f<2, processing by which the output value $[[a_0+a_1f^1+ \ldots +a_nf^n]]$ is calculated from the input value [[f]] is reduced to processing by which calculation is performed by using f−r+u and the concealed text $[[r]], [[r^2]], \ldots, [[r^n]], [[r-1]], [[(r-1)^2]], \ldots, [[(r-1)^n]]$ of a power of the previously generated random number r and a power of r−1. In general, information leaks when f−r+u is reconstructed; however, by adjusting f−r+u so as to be uniform random values greater than 0 and smaller than or equal to 1, it is possible to securely execute calculation of $a_0+a_1f^1+ \ldots +a_nf^n$.

Third Embodiment

When the logarithm log x of x can be expressed as log $x=a_0+a_1x^1+ \ldots +a_nx^n$ by using a polynomial, concealed text

[[log x]] of the logarithm log x can be efficiently calculated from concealed text [[x]] of x by using the secure computation algorithm of the first embodiment.

Hereinafter, input and output and procedures of a secure computation algorithm of a third embodiment and a secure computation system that implements the secure computation algorithm of the third embodiment will be described.

[Input and Output]

Input and output of the secure computation algorithm of the third embodiment shown in FIG. 8 will be described.

Input is the order n and coefficients $a_0, a_1, \ldots, a_n$ of a polynomial $a_0+a_1x^1+ \ldots +a_nx^n$ and concealed text [[x]] of a value x whose logarithm is subjected to calculation of the value. Moreover, concealed text $[[r]], [[r^2]], \ldots, [[r^n]]$, $[[r-1]], [[(r-1)^2]], \ldots, [[(r-1)^n]]$ of a power of a random number r, which satisfies 1≤r<2, and a power of r−1 is also input.

Output is concealed text [[log x]] of the logarithm log x of x.

[Procedures]

The procedures of the secure computation algorithm of the third embodiment depicted in FIG. 8 will be described. In so doing, expressions such as Step 1 and Step 2 are adopted by using the numerals on the left end of FIG. 8.

In Step 1, for the input concealed text [[x]], concealed text [[e]] and [[f]] of e and f which satisfy $x=2^e \times f$ (e is an integer and 1≤f<2) is generated. By using operations of Reference Non-patent Literature 1 to determine floating-point representation of [[x]], the concealed text [[e]] and [[f]] can be generated.

In Step 2, $[[a_0+a_1f^1+ \ldots +a_nf^n]]$ is calculated from the order n and the coefficients $a_0, a_1, \ldots, a_n$ of the polynomial, the concealed text $[[r]], [[r^2]], \ldots, [[r^n]], [[r-1]]$, $[[(r-1)^2]], \ldots, [[(r-1)^n]]$, and the concealed text [[f]] generated in Step 1. Here, $[[a_0+a_1f^1+ \ldots +a_nf^n]]=[[\log f]]$ holds.

In Step 3, [[log f]]+[[e]] is calculated from the concealed text [[e]] generated in Step 1 and the concealed text [[log f]] calculated in Step 2. Here, [[log f]]+[[e]]=[[log x]] holds.

[Secure Computation System]

Figure 9:
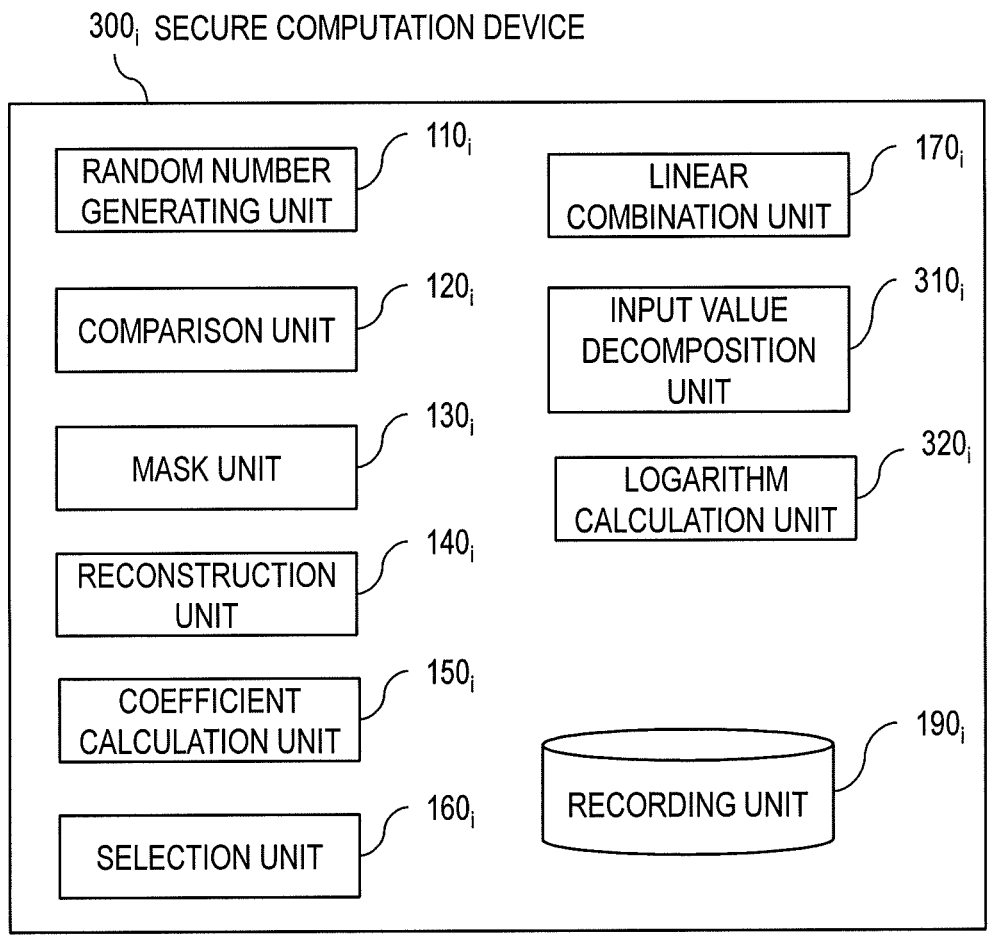
FIG. 9 is a block diagram depicting the configuration of a secure computation device $300_i$.
Figure 10:
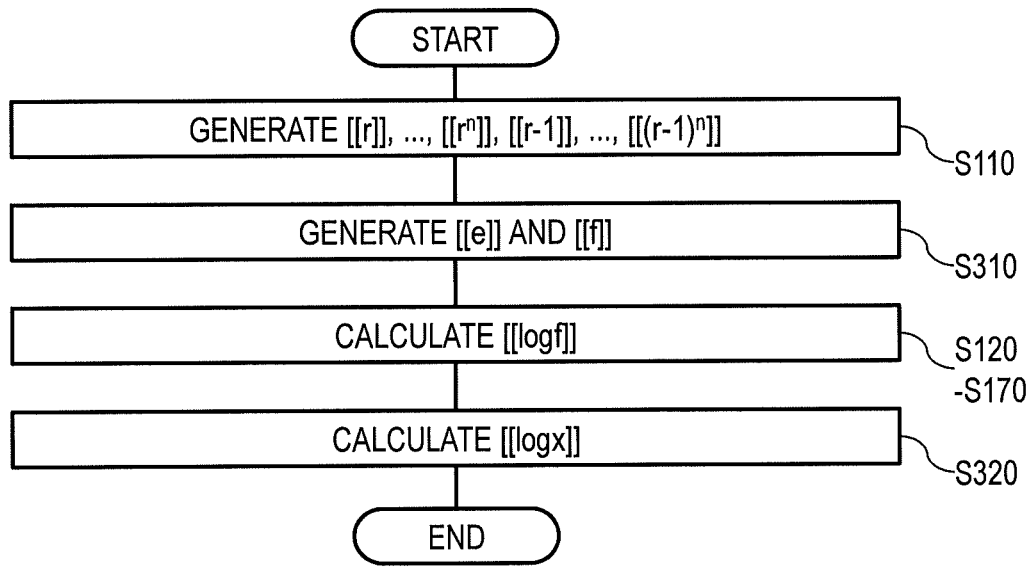
FIG. 10 is a flowchart showing an operation of a secure computation system 30.

Hereinafter, a secure computation system 30 of the third embodiment will be described with reference to FIGS. 9 and 10. The secure computation system 30 differs from the secure computation system 10 in that the secure computation system 30 includes W (W is a predetermined integer greater than or equal to 2) secure computation devices $300_1, \ldots, 300_W$ instead of including W secure computation devices $100_1, \ldots, 100_W$. FIG. 9 is a block diagram depicting the configuration of a secure computation device $300_i$ (1≤i≤W). FIG. 10 is a flowchart showing an operation of the secure computation system 30.

As depicted in FIG. 9, the secure computation device $300_i$ differs from the secure computation device $100_i$ in that the secure computation device $300_i$ further includes an input value decomposition unit $310_i$ and a logarithm calculation unit $320_i$. The input value decomposition unit $310_i$ and the logarithm calculation unit $320_i$ are also configured so as to be capable of executing, of computations which are required in the secure computation algorithm, computations which are required to implement the functions thereof.

An input value decomposing means 310 of the secure computation system 30 is configured with the input value decomposition units $310_1, \ldots, 310_W$, and a logarithm calculating means 320 is configured with the logarithm calculation units $320_1, \ldots, 320_W$.

By using concealed text $[[r]], [[r^2]], \ldots, [[r^n]], [[r-1]]$, $[[(r-1)^2]], \ldots, [[(r-1)^n]]$ of a power of the previously generated random number r (1≤r<2) and a power of r−1, the secure computation system 30 calculates concealed text [[log x]] of the logarithm log x of x from concealed text [[x]] of the value x which is substituted into a polynomial. Hereinafter, an operation of the secure computation system 30 will be described in accordance with FIG. 10.

The random number generating means 110 generates a random number r which satisfies 1≤r<2 and generates concealed text $[[r]], [[r^2]], \ldots, [[r^n]], [[r-1]], [[(r-1)^2]], \ldots$, $[[(r-1)^n]]$ (S110). This corresponds to a preliminary setup of input values of the secure computation algorithm of FIG. 8. The concealed text $[[r]], [[r^2]], \ldots, [[r^n]], [[r-1]]$, $[[(r-1)^2]], \ldots, [[(r-1)^n]]$ is recorded on the recording units $190_1, \ldots, 190_W$.

The input value decomposing means 310 generates, from the concealed text [[x]], concealed text [[e]] and [[f]] of e and f which satisfy $x=2^e \times f$ (e is an integer and 1≤f<2) (S310). This corresponds to Step 1 of the secure computation algorithm of FIG. 8.

The comparing means 120, the mask means 130, the reconstructing means 140, the coefficient calculating means 150, the selecting means 160, and the linear combination means 170 calculate $[[a_0+a_1f^1+ \ldots +a_nf^n]]$ (=[[log f]]) from the order n and the coefficients $a_0, a_1, \ldots, a_n$ of the polynomial, the concealed text $[[r]], [[r^2]], \ldots, [[r^n]]$, $[[r-1]], [[(r-1)^2]], \ldots, [[(r-1)^n]]$ generated before input of [[x]], and the concealed text [[f]] generated in S310 (S120 to S170). This corresponds to Step 2 of the secure computation algorithm of FIG. 8 (Steps 1 to 6 of the secure computation algorithm of FIG. 1).

The logarithm calculating means 320 calculates [[log f]]+[[e]] as concealed text [[log x]] of the logarithm log x from the concealed text [[log f]] generated in S310 and the concealed text [[log f]] calculated in S120 to S170 (S320). This corresponds to Step 3 of the secure computation algorithm of FIG. 8.

According to the invention of the present embodiment, by performing calculation of the polynomial $a_0+a_1x^1+ \ldots +a_nx^n$ by using the secure computation algorithm of the first embodiment, it is possible to reduce the cost of calculating the concealed text [[log x]] of the logarithm log x from the concealed text [[x]]. Moreover, by using the fact that the range of f, which is obtained by decomposing x, is limited to 1≤f<2, processing by which the output value $[[a_0+a_1f^1+ \ldots +a_nf^n]]$ is calculated from the input value [[f]] is reduced to processing by which calculation is performed by using f−r+u and the concealed text $[[r]], [[r^2]], \ldots, [[r^n]]$, $[[r-1]], [[(r-1)^2]], \ldots, [[(r-1)^n]]$ of a power of the previously generated random number r and a power of r−1. In general, information leaks when f−r+u is reconstructed; however, by adjusting f−r+u so as to be uniform random values greater than 0 and smaller than or equal to 1, it is possible to securely execute calculation of $a_0+a_1f^1+ \ldots +a_nf^n$.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, k is an integer which satisfies $k \leq x < k+1$, r is a random number which satisfies $k \leq r < k+1$, and $[[r]], [[r^2]], \ldots, [[r^n]], [[r-1]], [[(r-1)^2]], \ldots, [[(r-1)^n]]$ are concealed text of a power of the random number r and a power of r−1, the secure computation system which includes two or more secure computation devices and calculates, from concealed text $[[x]]$ of the value x, concealed text $[[a_0+a_1x^1+ \ldots +a_nx^n]]$ of values of the n-th order polynomial $a_0+a_1x^1+ \ldots +a_nx^n$ in which the value x is substituted, the secure computation system comprising:

the two or more secure computation devices which each have processing circuitry and are configured to cooperatively:

receive, over a network, an input of the concealed text $[[x]]$;

generate concealed text $[[u]]$ of u (u=1 if $x \leq r$ holds and u=0 if $x \leq r$ does not hold), which is a result of magnitude comparison between the value x and the random number r, from the concealed text $[[x]]$ by using the concealed text $[[r]]$;

generate concealed text $[[c]]$ of a mask c as $[[c]]=[[x]]-[[r]]+[[u]]$ from the concealed text $[[x]]$, the concealed text $[[r]]$, and the concealed text $[[u]]$;

reconstruct the mask c from the concealed text [[c]];
calculate, for i=0, n, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for i=1, ..., n, concealed text $[[s_i]]$ of a selected value $s_i$ ($s_i=(r-1)^i$ if u=1 and $s_i=r^i$ if u=0), which is determined in accordance with the result u of magnitude comparison, from the concealed text [[u]]; and calculate a linear combination $b_0+b_1[[s_1]]+ \ldots +b_n[[s_n]]$ of the coefficient $b_i$ (i=0, ..., n) and the concealed text $[[s_i]]$ (i=1, ..., n) as the concealed text $[[a_0+a_1x^1+ \ldots +a_nx^n]]$, wherein each of the two or more secure computation devices is configured to act upon a divided portion of the concealed text [[x]], [[u]], [[r]], and $[[s_i]]$ such that each of the entire original text x, u, r, and $s_i$ is concealed from each of the secure computation devices.

2. A secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, r is a random number which satisfies $1 \leq r < 2$, [[r]], $[[r^2]]$, ..., $[[r^n]]$, [[(r-1)]], $[[(r-1)^2]]$, ..., $[[(r-1)^n]]$ are concealed text of a power of the random number r and a power of r−1, and a reciprocal 1/x of the value x is expressed as $1/x = a_0+a_1x^1+ \ldots +a_nx^n$, the secure computation system which includes two or more secure computation devices and calculates concealed text [[1/x]] of the reciprocal 1/x from concealed text [[x]] of the value x, the secure computation system comprising:

the two or more secure computation devices which each have processing circuitry and are configured to cooperatively:

receive, over a network, an input of the concealed text [[x]];

generate, from the concealed text [[x]], concealed text [[s]], [[e]], and [[f]] of s, e, and f which satisfy $x=s \times 2^e \times f$ ($s \in \{-1, 1\}$, e is an integer, and $1 \leq f < 2$);

generate concealed text [[u]] of u (u=1 if $f \leq r$ holds and u=0 if $f \leq r$ does not hold), which is a result of magnitude comparison between the f and the random number r, from the concealed text [[f]] by using the concealed text [[r]];

generate concealed text [[c]] of a mask c as [[c]]=[[f]]−[[r]]+[[u]] from the concealed text [[f]], the concealed text [[r]], and the concealed text [[u]];

reconstruct the mask c from the concealed text [[c]];

calculate, for i=0, ..., n, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for i=1, ..., n, concealed text $[[s_i]]$ of a selected value $s_i$ ($s_i=(r-1)^i$ if u=1 and $s_i=r^i$ if u=0),
which is determined in accordance with the result u of magnitude comparison, from the concealed text [[u]];

calculate a linear combination $b_0+b_1[[s_1]]+ \ldots +b_n[[s_n]]$ of the coefficient $b_i$ (i=0, ..., n) and the concealed text $[[s_i]]$ (i=1, ..., n) as concealed text [[1/f]] of a reciprocal 1/f of the f; and calculate $[[s]] \times ([[1/f]] << [[-e]])$ (where $[[1/f]] << [[-e]]$ is a value obtained by shifting 1/f to a left by −e bit) as the concealed text [[1/x]] from the concealed text [[s]], the concealed text [[e]], and the concealed text [[1/f]], wherein each of the two or more secure computation devices is configured to act upon a divided portion of the concealed text [[x]], [[s]], [[e]], [[f]], [[u]], $[[s_i]]$, [[−e]], and [[1/f]] such that each of the entire original text x, s, e, f, u, $s_j$, −e, and 1/f is concealed from each of the secure computation devices.

3. A secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, r is a random number which satisfies $1 \leq r < 2$, [[r]], $[[r^2]]$, ..., $[[r^n]]$, [[r−1]], $[[(r-1)^2]]$, ..., $[[(r-1)^n]]$ are concealed text of a power of the random number r and a power of r−1, and a logarithm log x of the value x is expressed as $\log x = a_0+a_1x^1+ \ldots +a_nx^n$, the secure computation system which includes two or more secure computation devices and calculates concealed text [[log x]] of the logarithm log x from concealed text [[x]] of the value x, the secure computation system comprising:

the two or more secure computation devices which each have processing circuitry and are configured to cooperatively:

receive, over a network, an input of the concealed text [[x]];

generate, from the concealed text, [[x]], concealed text [[e]] and [[f]] of e and f which satisfy $x=2^e \times f$ (e is an integer and $1 \leq f < 2$);

generate concealed text [[u]] of u (u=1 if $f \leq r$ holds and u=0 if $f \leq r$ does not hold), which is a result of magnitude comparison between the f and the random number r, from the concealed text [[f]] by using the concealed text [[r]];

generate concealed text [[c]] of a mask c as [[c]]=[[f]]−[[r]]+[[u]] from the concealed text [[f]], the concealed text [[r]], and the concealed text [[u]];

reconstruct the mask c from the concealed text [[c]];

calculate, for i=0, ..., n, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for i=1, ..., n, concealed text $[[s_i]]$ of a selected value $s_i$ ($s_i=(r-1)^i$ if u=1 and $s_i=r^i$ if u=0), which is determined in accordance with the result u of magnitude comparison, from the concealed text [[u]];

calculate a linear combination $b_0+b_1[[s_1]]+ \ldots +b_n[[s_n]]$ of the coefficient $b_i$ (i=0, ..., n) and the concealed text $[[s_i]]$ (i=1, ..., n) as concealed text [[log f]] of a logarithm log f of the f; and calculate [[log f]]+[[e]], which is a value obtained by adding e to the logarithm log f, as the concealed text [[log x]] from the concealed text [[e]] and the concealed text [[log f]], wherein each of the two or more secure computation devices is configured to act upon a divided portion of the concealed text [[x]], [[e]], [[f]], [[u]], [[r]], [[log f]], [[log x]], and [[s$_i$]], such that each of the entire original text x, e, f, u, r, log f, log x, and s$_j$ is concealed from each of the secure computation devices.

4. A secure computation device in a secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, k is an integer which satisfies k≤x<k+1, r is a random number which satisfies k≤r<k+1, and [[r]], [[r$^2$]], ..., [[r$^n$]], [[r−1]], [[(r−1)$^2$]], ..., [[(r−1)$^n$]] are concealed text of a power of the random number r and a power of r−1, the secure computation system which includes two or more secure computation devices and calculates, from the concealed text [[x]] of the value x, concealed text [[$a_0+a_1x^1+ \ldots +a_nx^n$]] of values of the n-th order polynomial $a_0+a_1x^1+ \ldots +a_nx^n$ in which the value x is substituted, the secure computation device comprising:

processing circuitry configured, in cooperation with the other of the two or more secure computation devices, to:

receive, over a network, an input of the concealed text [[x]];

generate concealed text [[u]] of u (u=1 if x≤r holds and u=0 if x≤r does not hold), which is a result of magnitude comparison between the value x and the random number r, from the concealed text [[x]] by using the concealed text [[r]];

generate concealed text [[c]] of a mask c as [[c]]=[[x]]−[[r]]+[[u]] from the concealed text [[x]], the concealed text [[r]], and the concealed text [[u]];

reconstruct the mask c from the concealed text [[c]];

calculate, for i=0, ..., n, a coefficient b$_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for i=1, ..., n, concealed text [[s$_i$]] of a selected value s$_i$ (s$_i$=(r−1)$^i$ if u=1 and s$_i$=r$^i$ if u=0), which is determined in accordance with the result u of magnitude comparison, from the concealed text [[u]]; and calculate a linear combination $b_0+b_1[[s_1]]+ \ldots +b_n[[s_n]]$ of the coefficient b$_i$ (i=0, ..., n) and the concealed text [[s$_i$]] (i=1, ..., n) as the concealed text [[$a_0+a_1x^1+ \ldots +a_nx^n$]], wherein each of the two or more secure computation devices is configured to act upon a divided portion of the concealed text [[x]], [[u]], [[r]], and [[s$_i$]] such that each of the entire original text x, u, r, and s$_j$ is concealed from each of the secure computation devices.

5. A secure computation device in a secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, r is a random number which satisfies 1≤r<2, [[r]], [[r$^2$]], ..., [[r$^n$]], [[r−1]], [[(r−1)$^2$]], ..., [[(r−1)$^n$]] are concealed text of a power of the random number r and a power of r−1, and a reciprocal 1/x of the value x is expressed as $1/x=a_0+a_1x^1+ \ldots +a_nx^n$, the secure computation system which includes two or more secure computation devices and calculates concealed text [[1/x]] of the reciprocal 1/x from concealed text [[x]] of the value x, the secure computation device comprising:

processing circuitry configured, in cooperation with the other of the two or more secure computation devices, to:

receive, over a network, an input of the concealed text [[x]];

generate, from the concealed text, [[x]], concealed text [[s]], [[e]], and [[f]] of s, e, and f which satisfy x=s×2$^e$×f (s∈{−1, 1}, e is an integer, and 1≤f<2);

generate concealed text [[u]] of u (u=1 if f≤r holds and u=0 if f≤r does not hold), which is a result of magnitude comparison between the f and the random number r, from the concealed text [[f]] by using the concealed text [[r]];

generate concealed text [[c]] of a mask c as [[c]]=[[f]]−[[r]]+[[u]] from the concealed text [[f]], the concealed text [[r]], and the concealed text [[u]];

reconstruct the mask c from the concealed text [[c]];

calculate, for i=0, ..., n, a coefficient b$_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for i=1, ..., n, concealed text [[s$_i$]] of a selected value s$_i$ (s$_i$=(r−1)$^i$ if u=1 and s$_i$=r$^i$ if u=0), which is determined in accordance with the result u of magnitude comparison, from the concealed text [[u]];

calculate a linear combination $b_0+b_1[[s_1]]+ \ldots +b_n[[s_n]]$ of the coefficient b$_i$ (i=0, ..., n) and the concealed text [[s$_i$]](i=1, ..., n) as concealed text [[1/f]] of a reciprocal 1/f of the f; and calculate [[s]]×([[1/f]]<<[[−e]] (where [[1/f]]<<[[−e]] is a value obtained by shifting 1/f to a left by −e bit) as the concealed text [[1/x]] from the concealed text [[s]], the concealed text [[e]], and the concealed text [[1/f]], wherein each of the two or more secure computation devices is configured to act upon a divided portion of the concealed text [[x]], [[s]], [[e]], [[f]], [[u]], [[r]], [[s$_i$]], [[−e]], and [[1/f]] such that each of the entire original text x, s, e, f, u, r, s$_j$, −e, and 1/f is concealed from each of the secure computation devices.

6. A secure computation device in a secure computation system in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, r is a random number which satisfies 1≤r<2, [[r]], [[r$^2$]], ..., [[r$^n$]], [[r−1]], [[(r−1)$^2$]], ..., [[(r−1)$^n$]] are assumed text of a power of the random number r and a power of r−1, and a logarithm log x of the value x is expressed as $\log x=a_0+a_1x^1+ \ldots +a_nx^n$, the secure computation system which includes two or more secure computation devices and calculates concealed text [[log x]] of the logarithm log x from concealed text [[x]] of the value x, the secure computation device comprising:

processing circuitry configured, in cooperation with the other of the two or more secure computation devices, to:
receive, over a network, an input of the concealed text $[[x]]$;
generate, from the concealed text, $[[x]]$, concealed text $[[e]]$ and $[[f]]$ of e and f which satisfy $x=2^e \times f$ (e is an integer and $1 \leq f < 2$);
generate concealed text $[[u]]$ of u (u=1 if $f \leq r$ holds and u=0 if $f \leq r$ does not hold), which is a result of magnitude comparison of the f and the random number r, from the concealed text $[[f]]$ by using the concealed text $[[r]]$;
generate concealed text $[[c]]$ of a mask c as $[[c]]=[[f]]-[[r]]+[[u]]$ from the concealed text $[[f]]$, the concealed text $[[r]]$, and the concealed text $[[u]]$;
reconstruct the mask c from the concealed text $[[c]]$;
calculate, for $i=0, \ldots, n$, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for $i=1, \ldots, n$, concealed text $[[s_i]]$ of a selected value $s_i$ ($s_i=(r-1)^i$ if u=1 and $s_i=r^i$ if u=0), which is determined in accordance with the result u of magnitude comparison, from the concealed text $[[u]]$;
calculate a linear combination $b_0+b_1[[s_1]]+ \ldots +b_n[[s_n]]$ of the coefficient $b_i$ ($i=0, \ldots, n$) and the concealed text $[[s_i]]$ ($i=1, \ldots, n$) as concealed text $[[\log f]]$ of a logarithm log f of the f; and
calculate $[[\log f]]+[[e]]$, which is a value obtained by adding e to the logarithm log f, as the concealed text $[[\log x]]$ from the concealed text $[[e]]$ and the concealed text $[[\log f]]$,
wherein each of the two or more secure computation devices is configured to act upon a divided portion of the concealed text $[[x]]$, $[[e]]$, $[[f]]$, $[[u]]$, $[[r]]$, $[[\log f]]$, $[[\log x]]$, and $[[s_i]]$, and such that each of the entire original text x, e, f, u, r, log f, log x, and $s_i$ is concealed from each of the secure computation devices.

7. A secure computation method in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, k is an integer which satisfies $k \leq x < k+1$, r is a random number which satisfies $k \leq r < k+1$, and $[[r]], [[r^2]], \ldots, [[r^n]], [[r-1]], [[(r-1)^2]], \ldots, [[(r-1)^n]]$ are concealed text of a power of the random number r and a power of r−1, the secure computation method by which concealed text $[[a_0+a_1x^1+ \ldots +a_nx^n]]$ of values of the n-th order polynomial $a_0+a_1x^1+ \ldots +a_nx^n$ in which the value x is substituted is calculated from concealed text of the value x by using a secure computation system which includes two or more secure computation devices, the secure computation method comprising:
the two or more secure computation devices cooperatively performing
a receiving step of receiving, over a network, an input of the concealed text $[[x]]$;
a comparing step in which the secure computation system generates concealed text $[[u]]$ of u (u=1 if $x \leq r$ holds and u=0 if $x \leq r$ does not hold), which is a result of magnitude comparison between the value x and the random number r, from the concealed text $[[x]]$ by using the concealed text $[[r]]$;
a mask step in which the secure computation system generates concealed text $[[c]]$ of a mask c as $[[c]]=[[x]]-[[r]]+[[u]]$ from the concealed text $[[x]]$, the concealed text $[[r]]$, and the concealed text $[[u]]$;
a reconstructing step in which the secure computation system reconstructs the mask c from the concealed text $[[c]]$;
a coefficient calculating step in which the secure computation system calculates, for $i=0, \ldots, n$, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

a selecting step in which the secure computation system generates, for $i=1, \ldots, n$, concealed text $[[s_i]]$ of a selected value $s_i$ ($s_i=(r-1)^i$ if u=1 and $s_i=r^i$ if u=0), which is determined in accordance with the result u of magnitude comparison, from the concealed text $[[u]]$; and
a linear combination step in which the secure computation system calculates a linear combination $b_0+b_1[[s_1]]+ \ldots +b_n[[s_n]]$ of the coefficient $b_i$ ($i=0, \ldots, n$) and the concealed text $[[s_i]]$ ($i=1, \ldots, n$) as the concealed text $[[a_0+a_1x^1+ \ldots +a_nx^n]]$,
wherein each of the two or more secure computation devices is configured to act upon a divided portion of the concealed text $[[x]]$, $[[u]]$, $[[r]]$, and $[[s_i]]$ such that each of the entire original text x, u, r, and $s_i$ is concealed from each of the secure computation devices.

8. A secure computation method in which $a_0+a_1x^1+ \ldots +a_nx^n$ is an n-th order polynomial (n is an order of the polynomial and $a_0, a_1, \ldots, a_n$ are coefficients of the polynomial) in a variable x, x is a value which is substituted into the n-th order polynomial, r is a random number which satisfies $1 \leq r < 2$, $[[r]], [[r^2]], \ldots, [[r^n]], [[r-1]], [[(r-1)^2]], \ldots, [[(r-1)^n]]$ are concealed text of a power of the random number r and a power of r−1, and a reciprocal 1/x of the value x is expressed as $1/x=a_0+a_1x^1+ \ldots +a_nx^n$, the secure computation method by which concealed text $[[1/x]]$ of the reciprocal 1/x is calculated from concealed text $[[x]]$ of the value x by using a secure computation system which includes two or more secure computation devices, the secure computation method comprising:
the two or more secure computation devices cooperatively performing
a receiving step of receiving, over a network, an input of the concealed text $[[x]]$;
an input value decomposing step in which the secure computation system generates, from the concealed text $[[x]]$, concealed text $[[s]]$, $[[e]]$, and $[[f]]$, and of s, e, and f which satisfy $x=s \times 2^e \times f$ ($s \in \{-1, 1\}$, e is an integer, and $1 \leq f < 2$);
a comparing step in which the secure computation system generates concealed text $[[u]]$ of u (u=1 if $f \leq r$ holds and u=0 if $f \leq r$ does not hold), which is a result of magnitude comparison between the f and the random number r, from the concealed text $[[f]]$ by using the concealed text $[[r]]$;
a mask step in which the secure computation system generates concealed text $[[c]]$ of a mask c as $[[c]]=$

[[f]]−[[r]]+[[u]] from the concealed text [[f]], the concealed text [[r]], and the concealed text [[u]];
a reconstructing step in which the secure computation system reconstructs the mask c from the concealed text [[c]];
a coefficient calculating step in which the secure computation system calculates, for i=0, . . . , n, a coefficient $b_i$ by a formula below from the order n, the coefficients $a_0$, $a_1$, . . . , $a_n$, and the mask c;

$$b_i = \sum_{j=i}^{n} a_j \binom{j}{i} c^{j-i}$$

a selecting step in which the secure computation system generates, for i=1, . . . , n, concealed text [[$s_i$]] of a selected value $s_i$ ($s_i$=(r−1)$^i$ if u=1 and $s_i$=r$^i$ if u=0), which is determined in accordance with the result u of magnitude comparison, from the concealed text [[u]];
a linear combination step in which the secure computation system calculates a linear combination $b_0$+$b_1$ [[$s_1$]]+ . . . +$b_n$ [[$s_n$]] of the coefficient $b_i$ (i=0, . . . , n) and the concealed text [[$s_i$]] (i=1, . . . , n) as concealed text [[1/f]] of a reciprocal 1/f of the f; and
a reciprocal calculating step in which the secure computation system calculates [[s]]×([[1/f]]<<[[−e]]) (where [[1/f]]<<[[−e]] is a value obtained by shifting 1/f to a left by −e bit) as the concealed text [[1/x]] from the concealed text [[s]], the concealed text [[e]], and the concealed text [[1/f]],
wherein each of the two or more secure computation devices is configured to act upon a divided portion of the concealed text [[x]], [[s]], [[e]], [[f]], [[u]], [[r]], [[$s_i$]], [[−e]], and [[1/f]] such that each of the entire original text x, s, e, f, u, r, $s_j$, −e, and 1/f is concealed from each of the secure computation devices.

9. A secure computation method in which $a_0$+$a_1$x$^1$+ . . . +$a_n$x$^n$ is an n-th order polynomial (n is an order of the polynomial and $a_0$, $a_1$, . . . , $a_n$ are coefficients of the polynomial) in a variable x, x is a value which is substituted into the n-th order polynomial, r is a random number which satisfies 1≤r<2, [[r]], [[r$^2$]], . . . , [[r$^n$]], [[r−1]], [[(r−1)$^2$]], . . . , [[(r−1)$^n$]] are concealed text of a power of the random number r and a power of r−1, and a logarithm log x of the value x is expressed as log x=$a_0$+$a_1$x$^1$+ . . . +$a_n$x$^n$, the secure computation method by which concealed text [[log x]] of the logarithm log x is calculated from concealed text [[x]] of the value x by using a secure computation system which includes two or more secure computation devices, the secure computation method comprising:
the two or more secure computation devices cooperatively performing
a receiving step of receiving, over a network, an input of the concealed text [[x]];
an input value decomposing step in which the secure computation system generates, from the concealed text [[x]], concealed text [[e]] and [[f]] of e and f which satisfy x=2$^e$×f (e is an integer and 1≤f<2);
a comparing step in which the secure computation system generates concealed text [[u]] of u (u=1 if f≤r holds and u=0 if f≤r does not hold), which is a result of magnitude comparison between the f and the random number r, from the concealed text [[f]] by using the concealed text [[r]];
a mask step in which the secure computation system generates concealed text [[c]] of a mask c as [[c]]=

[[f]]−[[r]]+[[u]] from the concealed text [[f]], the concealed text [[r]], and the concealed text [[u]];
a reconstructing step in which the secure computation system reconstructs the mask c from the concealed text [[c]];
a coefficient calculating step in which the secure computation system calculates, for i=0, . . . , n, a coefficient $b_i$ by a formula below from the order n, the coefficients $a_0$, $a_1$, . . . , $a_n$, and the mask c;

$$b_i = \sum_{j=i}^{n} a_j \binom{j}{i} c^{j-i}$$

a selecting step in which the secure computation system generates, for i=1, . . . , n, concealed text [[$s_i$]] of a selected value $s_i$ ($s_i$=(r−1)$^1$ if u=1 and $s_i$=r$^i$ if u=0), which is determined in accordance with the result u of magnitude comparison, from the concealed text [[u]];
a linear combination step in which the secure computation system calculates a linear combination $b_0$+$b_1$ [[$s_1$]]+ . . . +$b_n$ [[$s_n$]] of the coefficient $b_i$ (i=0, . . . , n) and the concealed text [[$s_i$]] (i=1, . . . , n) as concealed text [[log f]] of a logarithm log f of the f; and
a logarithm calculating step in which the secure computation system calculates [[log f]]+[[e]], which is a value obtained by adding e to the logarithm log f, as the concealed text [[log x]] from the concealed text [[e]] and the concealed text [[log f]],
wherein each of the two or more secure computation devices is configured to act upon a divided portion of the concealed text [[x]], [[e]], [[f]], [[u]], [[r]], [[log f]], [[log x]], and [[$s_i$]] such that each of the entire original text x, e, f, u, r, log f, log x, and $s_j$ is concealed from each of the secure computation devices.

10. A non-transitory computer readable medium that stores a program for causing a computer to function as a secure computation device in a secure computation system in which $a_0$+$a_1$x$^1$+ . . . +$a_n$x$^n$ is an n-th order polynomial (n is an order of the polynomial and $a_0$, $a_1$, . . . , $a_n$ are coefficients of the polynomial) in a variable x, x is a value which is substituted into the n-th order polynomial, k is an integer which satisfies k≤x<k+1, r is a random number which satisfies k≤r<k+1, and [[r]], [[r$^2$]], . . . , [[r$^n$]], [[r−1]], [[(r−1)$^2$]], . . . , [[(r−1)$^n$]] are concealed text of a power of the random number r and a power of r−1, the secure computation system which includes two or more secure computation devices and calculates, from the concealed text [[x]] of the value x, concealed text [[$a_0$+$a_1$x$^1$+ . . . +$a_n$x$^n$]] of values of the n-th order polynomial $a_0$+$a_1$x$^1$+ . . . +$a_n$x$^n$ in which the value x is substituted, the secure computation device comprising:
processing circuitry configured, in cooperation with the other of the two or more secure computation devices, to:
receive, over a network, an input of the concealed text [[x]],
generate concealed text [[u]] of u (u=1 if x≤r holds and u=0 if x≤r does not hold), which is a result of magnitude comparison between the value x and the random number r, from the concealed text [[x]] by using the concealed text [[r]];
generate concealed text [[c]] of a mask c as [[c]]=[[x]]−[[r]]+[[u]] from the concealed text [[x]], the concealed text [[r]], and the concealed text [[u]];

reconstruct the mask c from the concealed text $[[c]]$;
calculate, for $i=0, \ldots, n$, a coefficient $b_i$ by a formula below from the order n, the coefficients $a_0, a_1, \ldots, a_n$, and the mask c;

$$b_i = \sum_{j=i}^{n} a_j \binom{j}{i} c^{j-i}$$

generate, for $i=1, \ldots, n$, concealed text $[[s_i]]$ of a selected value $s_i$ ($s_i=(r-1)^i$ if $u=1$ and $s_i=r^i$ if $u=0$), which is determined in accordance with the result u of magnitude comparison, from the concealed text $[[u]]$; and calculate a linear combination $b_0+b_1[[s_1]]+ \ldots +b_n[[s_n]]$ of the coefficient $b_i$ ($i=0, \ldots, n$) and the concealed text $[[s_i]]$ ($i=1, \ldots, n$) as the concealed text $[[a_0+a_1x^1+ \ldots +a_nx^n]]$, wherein each of the two or more secure computation devices is configured to act upon a divided portion of the concealed text $[[x]]$, $[[u]]$, $[[r]]$, and $[[s_i]]$ such that each of the entire original text $x, u, r, s_i$ is concealed from each of the secure computation devices.

\* \* \* \* \*